US011738835B2

(12) United States Patent
Solberg et al.

(10) Patent No.: US 11,738,835 B2
(45) Date of Patent: Aug. 29, 2023

(54) DISTRIBUTED DECISION MAKING

(71) Applicant: Kongsberg Maritime CM AS, Horten (NO)

(72) Inventors: Kenneth Solberg, Alesund (NO); Carl Johansson, Alesund (NO); Morten Skogvold, Alesund (NO)

(73) Assignee: KONGSBERG MARITIME AS, Horten (NO)

( * ) Notice: Subject to any disclaimer, the term of this patent is extended or adjusted under 35 U.S.C. 154(b) by 450 days.

(21) Appl. No.: 16/978,529

(22) PCT Filed: Mar. 6, 2019

(86) PCT No.: PCT/NO2019/050048
§ 371 (c)(1),
(2) Date: Sep. 4, 2020

(87) PCT Pub. No.: WO2019/172774
PCT Pub. Date: Sep. 12, 2019

(65) Prior Publication Data
US 2020/0398954 A1 Dec. 24, 2020

(30) Foreign Application Priority Data
Mar. 7, 2018 (NO) .................................... 20180336

(51) Int. Cl.
B63B 35/00 (2020.01)
B63B 79/40 (2020.01)
(Continued)

(52) U.S. Cl.
CPC .............. B63B 79/40 (2020.01); B63B 43/00 (2013.01); B63H 21/21 (2013.01);
(Continued)

(58) Field of Classification Search
CPC ......... B63B 79/40; B63B 79/10; B63B 43/00; B63B 79/30; B63B 2035/007;
(Continued)

(56) References Cited

U.S. PATENT DOCUMENTS 7,389,735 B2 * 6/2008 Kaji ........................ B63B 21/00
114/230.1
7,883,292 B2 * 2/2011 Thompson .............. B63B 21/66
405/173
(Continued)

FOREIGN PATENT DOCUMENTS

| WO | 2004059411 | 7/2004 |
| WO | 2006061864 | 6/2006 |

OTHER PUBLICATIONS

Perera et al., Experimental Evaluations on Ship Autonomous Navigation and Collision Avoidance by Intelligent Guidance, 2014, IEEE, p. 374-387 (Year: 2014).*
(Continued)

Primary Examiner — McDieunel Marc
(74) Attorney, Agent, or Firm — Wissing Miller LLP

(57) ABSTRACT

The invention relates to marine vessel safety system which ensures that a marine vessel enters a safe state in the event of at least one malfunction in any vessel operation systems and components of the marine vessel. The marine vessel safety system comprises at least one vessel monitoring system, at least one malfunction evaluation system and a safe-state control system.

18 Claims, 5 Drawing Sheets

(51) Int. Cl.
   *B63B 43/00*    (2006.01)
   *B63H 21/21*    (2006.01)
   *G05B 23/02*    (2006.01)
   *G05D 1/02*     (2020.01)

(52) U.S. Cl.
   CPC ....... *G05B 23/0275* (2013.01); *G05D 1/0206* (2013.01); *B63B 35/00* (2013.01)

(58) Field of Classification Search
   CPC ...... B63B 35/00; G05B 23/0275; G05B 9/02; G05B 2219/14006; B63H 21/21; G05D 1/0206; G08G 3/02
   See application file for complete search history.

(56) References Cited

U.S. PATENT DOCUMENTS

| | | | | |
|---|---|---|---|---|
| 8,172,480 B2* | 5/2012 | Thompson | ........... | G01V 1/3852 |
| | | | | 405/166 |
| 8,614,633 B1 | 12/2013 | Lear | | |
| 8,701,718 B1* | 4/2014 | Turiello | ................ | G08B 21/18 |
| | | | | 141/2 |
| 8,944,865 B1* | 2/2015 | Krabacher | ............. | B63H 21/21 |
| | | | | 440/1 |
| 10,793,245 B1* | 10/2020 | Trotter | .................... | G08B 7/06 |
| 2009/0269062 A1 | 10/2009 | Jestel | | |
| 2010/0054078 A1* | 3/2010 | Thompson | .............. | B63B 35/04 |
| | | | | 367/20 |
| 2020/0363798 A1* | 11/2020 | Harnett | ................. | B64D 47/02 |

OTHER PUBLICATIONS

Perera et al., Intelligent Ocean Navigation and Fuzzy-Bayesian Decision/Action Formulation, 2012, IEEE, p. 204-219 (Year: 2012).*
Benjamin et al., COLREGS-based navigation of autonomous marine vehicles, 2004, IEEE, p. 32-39 (Year: 2004).*
Hagen et al., MPC-based Collision Avoidance Strategy for Existing Marine Vessel Guidance Systems, 2018, IEEE, p. 7618-7623 (Year: 2018).*
Norwegian Search Report mailed in No. 20180336 dated Sep. 26, 2018.(2 pages).
International Search Report and Written Opinion mailed in PCT/NO2019/0500048 dated May 21, 2019 ( 6 pages).
International Preliminary Report on Patentability mailed in PCT/NO2019/050048 dated Sep. 8, 2020 (4 pages).

* cited by examiner

DISTRIBUTED DECISION MAKING

CROSS-REFERENCE TO RELATED APPLICATIONS

This application is a 371 of PCT/NO2019/050048 filed on Mar. 6, 2019, published on Sep. 12, 2019 under publication number WO 2019/172774 A1, which claims priority benefits from Norwegian Patent Application No. 20180336 filed Mar. 7, 2018, both of which are incorporated herein in their entirety by reference.

TECHNICAL FIELD

The disclosure relates to a system that reliably ensures that a marine vessel enters a safe state in the event of any malfunction in a system or component relevant for the operation of the vessel.

BACKGROUND

Marine vessels contain an ever-growing amount of technical equipment in order to comply with the increasing requirements for functionality, both for the vessels themselves, but also for their cargo. Technical systems for automatic navigation, dynamic positioning, weather analysis and remote cargo surveillance are a few examples of a whole range of already existing systems, with many more under development. The advent of gradually more autonomous marine vessels is expected to further speed up the development of automated control systems until fully autonomous marine vessels are a reality.

Although the growth in technical equipment on-board marine vessels both simplify and optimize their operation, it comes with the drawback of increased complexity and consequently often increased fragility. The number and variety of possible malfunctions that can occur increases, and the complexity of the various systems means that these malfunctions get increasingly more difficult to correct. The correction of such malfunctions might for example require specialized personnel, which is rarely available on-board, and in the case of autonomous vessels, not at all. Increasing automation, remote operation and autonomy also increase the threat of cyber-attacks, leading to the requirement for cyber-safety and over-ruling functions on-board.

In order to handle the growing risk imposed by growing complexity and increased autonomy of marine vessels, it is necessary to implement novel back-up solutions and procedures in order to guarantee for the safety of the vessel and its surroundings in the case of any malfunction. Such back-up solutions may for example comprise transferring any compromised tasks over to manual staff or to an automatic back-up system, or in more severe cases, to implement a safe-configuration (fail-safe-state) for the vessel as a whole. In the latter case, a safe-configuration for the vessel could for example involve a cooperation between any remaining functioning systems of the vessel in order to operate the vessel in a safe manner.

The complexity and diversity of the systems and components belonging to a marine vessel also lead to increased difficulty in detecting a malfunction. A software error in a control system might for example affect the various outputs from this system, and hence make it difficult for the system itself to report any malfunction. A cyber-attack would have the potential of being even more severe, as the hackers could fake the output signals from any affected system, and thus make the marine vessel as a whole appear to be fully functioning.

It is the goal of the present invention to ensure the safety of a marine vessel. In particular, it is the goal of the present invention to ensure the safety of a marine vessel in the event of a malfunction in a system or component of the marine vessel.

SUMMARY OF THE INVENTION

In a first aspect of the invention, the invention provides a marine vessel safety system which ensures that a marine vessel enters a safe state in the event of at least one severe malfunction in any vessel operation systems and components of the marine vessel, the marine vessel safety system comprises at least one vessel monitoring system, configured to monitor the vessel operation systems and components of the marine vessel, at least one malfunction evaluation system, configured to detect any malfunction in the vessel operation systems and components of the marine vessel and to evaluate the severity of the detected malfunction, a safe-state control system, configured to execute a set of control commands, which forces the vessel in to a safe state if any of the malfunction evaluation systems detect any severe malfunction in the vessel operation systems and components.

The marine vessel may according to one embodiment of the invention be a remote and autonomous, R&A, marine vessel. The marine vessel safety system may further comprise at least one decision-making system. The at least one decision-making system may comprise at least one decision-making system positioned on-board the R&A marine vessel. The at least one decision-making system may comprise at least one decision-making system positioned in a location remote from the R&A marine vessel. The at least one decision-making system may comprise at least one malfunction evaluation system.

In one embodiment of the invention, the at least one malfunction evaluation system may comprise a vessel monitoring system.

In another embodiment of the invention, the vessel monitoring system may be independent from any other system in the marine vessel. The vessel monitoring system may be autonomous. The vessel monitoring system may be firmware programmed.

At least one of the vessel operation systems and components of the marine vessel may be chosen from the group comprising engine control system, propeller, propulsion control system, communication system, navigation system, water cooling system, dynamic positioning system, distress signal, communication system, route planning system, situation awareness system, collision avoidance system, mission management system, equipment health monitoring system, energy management system, integrated alarm system, cyber security system such as intrusion detection system, steering gear, autopilot, position reference systems GNSS etc., deck machinery systems, machinery recovery systems and artificial chief engineer.

Each state of each of them vessel operation systems and components of the marine vessel may be defined by a set of any number, n, of parameters $m.1, m.2, m.3, m.4, \ldots, m.n$. At least one of the parameters, in at least one of the sets of any number of parameters, may represent a property of the respective vessel operation system or component of the marine vessel chosen from the group comprising pressure, temperature, sound, voltage, frequency, gas-concentration, humidity, pH, connectivity capability, network activity, software component activity, CPU load, memory usage, connectivity activity, position and latency. The vessel monitoring system may be configured to monitor each set of parameters m.1, m.2, m.3, m.4, . . . , m.n defining the state of each of the vessel operation systems and components of the marine vessel.

In one embodiment of the invention, the malfunction evaluation system may comprise at least one malfunction trigger algorithm. The at least one of malfunction trigger algorithm may be configured to compare each set of parameters m.1, m.2, m.3, m.4, . . . , m.n with a set of allowable threshold values $T_{m.1}, T_{m.2}, T_{m.3}, T_{m.4}, \ldots, T_{m.n}$ defined as a set of ranges, each set of ranges is associated with a particular set of parameters m.1, m.2, m.3, m.4, . . . , m.n and if any one of the parameter values $I_{m.1}, I_{m.2}, I_{m.3}, I_{m.4}, \ldots, I_{m.n}$ in the set of parameters is outside the corresponding allowable threshold value $T_{m.1}, T_{m.2}, T_{m.3}, T_{m.4}, \ldots, T_{m.n}$ defined in the set of ranges, then send a malfunction signal to a logical comparator L1, which outputs an activation signal to the safe state control system.

According to one embodiment of the invention, the malfunction evaluation system evaluates the detected malfunction in light of the state of at least one other amongst the vessel operation systems and components of the marine vessel.

The malfunction evaluation system may according to another embodiment of the invention comprise at least one system chosen from the group: route planning system, situation awareness system, collision avoidance system and dynamic positioning system.

Each of the malfunction evaluation systems may be independently capable of activating the safe-state control system.

In yet another embodiment of the invention, said set of commands executable by the safe-state control system may be chosen based on any of the sets of parameters that defines the states of the vessel operation systems and components of the marine vessel. Said set of commands executable by the safe-state control system may comprise at least one command which determines at least one of the following: vessel rudder position, vessel propulsion levels, activation of a dynamic positioning system, activation of a distress signal communication system, activation of a route planning system, activation of a situation awareness system, activation of a collision avoidance system, activation of a machinery recovery system, notification of a remote operator, activation of a sound signal, activation of a vessel whistle, activation of a light signal, activation of a flash signaling device, activation of a light signal, lantern activation/deactivation, activation of a loudspeaker announcement and disconnect remote control.

At least one safe state is defined amongst the actions chosen from the group comprising: the marine vessel proceeds to the next waypoint, the marine vessel stops and enters DP-mode, the marine vessel returns to the previous waypoint, the marine vessel navigates back to its last known safe position, the marine vessel navigates to the nearest available safe position, the marine vessel drops an anchor, the marine vessel shuts down some machinery, the marine vessel shuts down all machinery, the marine vessel stops propellers and drifts, and the marine vessel maintains it relative position relative to an object.

Other advantageous features will be apparent from the accompanying claims.

BRIEF DESCRIPTION OF THE DRAWINGS

In order to make the invention more readily understandable, the discussion that follows will refer to the accompanying drawings, in which.

DETAILED DESCRIPTION OF THE INVENTION

Figure 1:
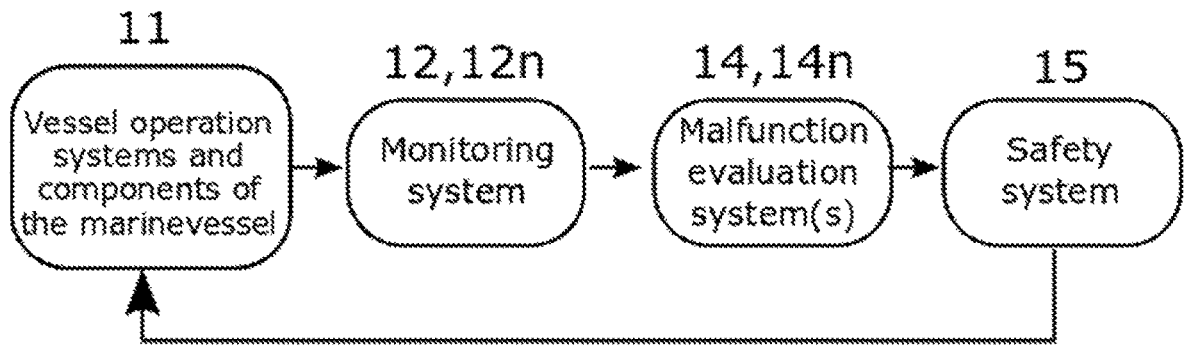
FIG. 1 shows a generic principle of a marine vessel safety system for marine vessels which may be autonomous vessels and/or remotely operated vessels.
Figure 2:
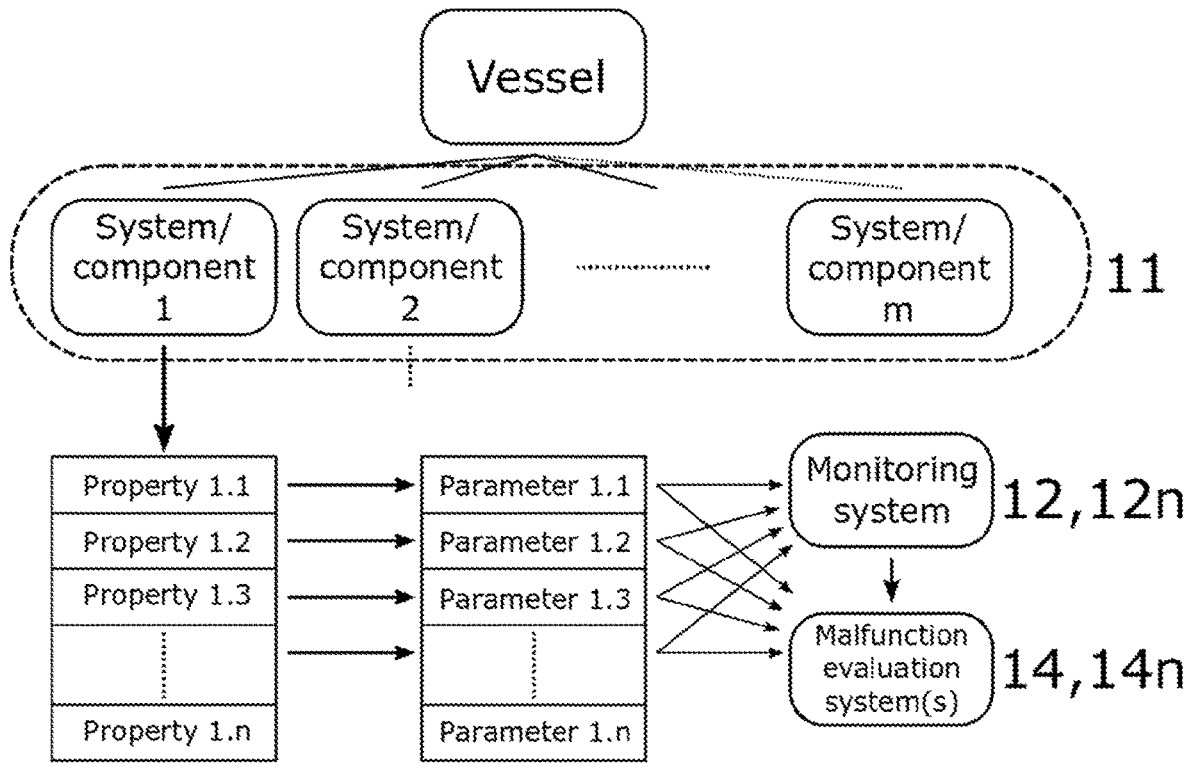
FIG. 2 shows a block diagram of a marine vessel safety system.

In the following, general embodiments as well as particular exemplary embodiments of the invention will be described. References and possible numerals will be made to the accompanying drawings. It shall be noted, however, that the drawings are exemplary embodiments only, and that other features and embodiments may well be within the scope of the invention as described.

The present invention concerns a vessel safety system 10 for ensuring the safety of a marine vessel in the event of any malfunction in systems or components relevant for the successful operation of the vessel. The system can act as a backup system to for example various control systems, e.g. navigation systems, and trigger when these systems are either compromised or for some reason are not capable of handling the operation of the vessel.

According to the present invention, the marine vessel safety system 10 ensures that the marine vessel enters a safe state in the event of any malfunction in vessel operation systems and components 11 of the marine vessel. The marine vessel safety system 10 comprises at least one vessel monitoring system 12, 12n, which monitors the state of the vessel by monitoring various systems and components 11 of the marine vessel.

The marine vessel safety system 10 also comprises at least one malfunction evaluation system 14, 14n, configured to detect any malfunction in the vessel operation systems and components 11 of the marine vessel and to evaluate the detected malfunction. A severity of the any malfunctions may be evaluated in light of safety and the ability of the vessel to complete its designated operation. Many malfunctions may often be of minor concern, and can thus be compensated for in a variety of ways by other systems on board or on shore.

Another component of the marine vessel safety system 10 is a safe-state control system 15. The safe-state control system 15 is configured to execute a set of control commands, which forces the vessel in to a safe state if any of the malfunction evaluation systems 14,14n detect any malfunction in the vessel operation systems and components 11. The system can be activated by the malfunction evaluation system 14, 14n for example in events where the safety of the vessel is at stake, where the safety of surrounding vessels or environment cannot be guaranteed, or where the operational ability of the vessel is sufficiently compromised. Which set of commands being executed may depend on a series of conditions, e.g. the nature and severity of any detected malfunctions, the state of the vessel, the weather, the mission of the vessel, etc. The safe-state control system 15 may comprise a plurality of subsystems or comprise several safe-state control systems 15.

The marine vessel safety system 10 is of particular relevance for remote and autonomous, R&A, marine vessels. Here, a crew is not always present on board in order to perform maintenance, repairs, or to take control of the vessel in the event of a malfunction related to the navigation and control of the vessel. R&A vessels may often operate far from external physical influences for long periods of time, only under the control of various decision-making systems. These decision-making systems can in one embodiment of the invention comprise on board decision-making systems, while they in another embodiment of the invention can comprise a decision-making system positioned in a remote location from the R&A vessel. On-board decision-making systems 14b,14c in R&A vessels may comprise virtual autonomous navigation systems, ANS, which further may comprise a wide variety of sub-systems, including systems for route planning, situation awareness systems, collision avoidance systems, systems defining the state of the ship, dynamic positioning systems, virtual chief engineer etc. Remote decision-making systems 14a are typically located on-shore, but can in principle be located in any other remote position from the R&A vessel. A remote decision-making system can for example be an operation central, operated by manual staff, which can communicate with and control the vessel on demand. All these decision-making systems may rely on at least one of the states of the various systems and components 11 of the marine vessel.

Decision-making systems in R&A vessels, like ANS-systems, are able to fully or partly control the operation of the vessel based on a wide variety of inputs concerning the vessel operation systems and components 11. The decision-making systems are thus, based on such inputs, able to estimate/determine how to instruct the vessel in order to achieve for example a predetermined goal. In the event of a malfunction in one of the vessel operation systems and components 11 in an R&A vessel, the decision-making system/systems may have to take this into consideration when estimating/determining how to instruct the vessel. The malfunction may in many cases be minor enough so that the operation of the vessel can proceed, either by taking no action at all, or by compensating for the malfunction through other actions. However, in some instances, a malfunction may be sufficiently serious so that it compromises safety or the ability of the vessel to complete its designated operation. Such a malfunction will be evaluated as severe by any decision-making system if it hinders any decision-making system in generating instructions for the vessel without compromising safety, or in generating instructions for the vessel which enables it to complete its designated operation. In any embodiment of the invention where the marine vessel safety system 10 comprises a decision-making system, the decision-making system may therefore comprise a malfunction evaluation system 14, 14n, or the malfunction evaluation system 14, 14n may comprise a decision-making system. Any decision-making system or sub-system of any decision-making system may alternatively comprise a malfunction evaluation system 14, 14n, be in itself a malfunction evaluation system 14, 14n or comprise all the functionalities of a malfunction evaluation system.

Any malfunction evaluation system 14, 14n may be configured to evaluate the severity of any malfunctions. This evaluation may be performed in light of the state of the vessel operation systems and components 11 of the marine vessel, and in light of safety and the ability of the vessel to complete its designated operation. As both the malfunction evaluation system 14, 14n and the monitoring system 12, 12n in this case need to be aware of the state of the vessel operation systems and components 11 of the marine vessel, these two systems can in principle be related to one another. Therefore, according to one embodiment of the present invention, the at least one malfunction evaluation system 14, 14n may comprise a vessel monitoring system 12, 12n. The at least one malfunction evaluation system 14, 14n may alternatively have a monitoring system 12, 12n implemented or may in itself have all the functionalities of the monitoring system 12, 12n. Alternatively, the vessel monitoring system 12, 12n may comprise a malfunction evaluation system 14, 14n, have a malfunction evaluation system 14, 14n implemented, or have all the functionalities of a malfunction evaluation system.

In another embodiment of the invention, the vessel monitoring system 12, 12n may be independent from any other system in the marine vessel. This is beneficial in the case of there being more than one malfunction evaluation system 14, 14n, and in case one of these malfunction evaluation systems 14, 14n experience at least one malfunction that makes it unable to activate the safe-state control system 15. Any functioning malfunction evaluation systems 14, 14n will in this case be able to detect any malfunctions in the relevant malfunction evaluation system 14, 14n and activate any safe-state control system 15.

The monitoring system 12 may in one embodiment of the invention be independent from any other system of the marine vessel. Such an independent system will thus be less prone to malfunctions, as it will be less affected by external influences from connected systems and less vulnerable to cyber-attacks. Alternatively, the vessel monitoring system 12, 12n may be autonomous. The vessel monitoring system 12, 12n may be firmware programmed.

Any malfunction may occur in any of the systems and components 11 of the marine vessel. Such systems and components 11 of the marine vessel may comprise e.g. situation awareness sensors, global positioning receivers, revolution counters, temperature sensors, communication units, route planning modules, situation awareness modules, collision awareness modules, dynamic positioning system, ship state definition modules, depth sensors, cameras, LIDAR, RADAR, map data readers, current readers, marine regulations interpreter, wind sensors, wave sensors, engine control system, propeller, propulsion control system, communication system, navigation system, water cooling system, distress signal communication system, route planning system, situation awareness system, collision avoidance system, mission management system, equipment health monitoring system 12, 12n, energy management system, integrated alarm system, cyber security system such as intrusion detection system, steering gear, autopilot, position reference systems GNSS etc., deck machinery systems, machinery recovery systems and artificial chief engineer.

In order to determine the state of the various systems and components 11 of the marine vessel, various properties determining these states must be measured/read/monitored. Each system or component of the marine vessel may typically have at least one readable output signal, and sometimes one or more readable input signals. Each of these signals, may further be stored/read/defined as a parameter which may be interpreted by secondary systems, like a malfunction evaluation system 14, 14n. A system or component of the marine vessel may also have an internal property, which may for example be read by a sensor and subsequently transmitted. Each state, m, of each of the vessel operation systems and components 11 of the marine vessel may thus be defined by a set of any number, n, of parameters m.1, m.2, m.3, m.4, . . . , m.n, representative of a corresponding set of properties related to that system or component.

In one embodiment of the invention the at least one of the parameters, in at least one of the sets of any number of parameters, represents a property of the respective vessel operation system or component 11 of the marine vessel chosen from the group comprising, pressure, temperature, sound, voltage, frequency, gas-concentration, humidity, pH, connectivity capability, network activity, software component activity, CPU load, memory usage, connectivity activity, position, latency.

The vessel monitoring system 12, 12n may further be configured to monitor each set of parameters m.1, m.2, m.3, m.4, . . . , m.n which defines the state of each of the vessel operation systems and components 11 of the marine vessel. This can be done by reading the various values of the parameters electronically, either analogously or digitally.

The vessel monitoring system 12, 12n may monitor the various systems and components 11 of the marine vessel by reading signals form these systems and components 11. Such signals may be analogue signals, e.g. electrical signals, like voltage signals, current signals, frequency signals, they may be sound signals, force signals, pressure signals etc. The vessel monitoring system 12, 12n may transform any information, e.g. analogous signals, of the various systems and components 11 of the marine vessel into digital signals. The vessel monitoring system 12, 12n may comprise a receiver or an analogue to digital converter or both.

Figure 3:
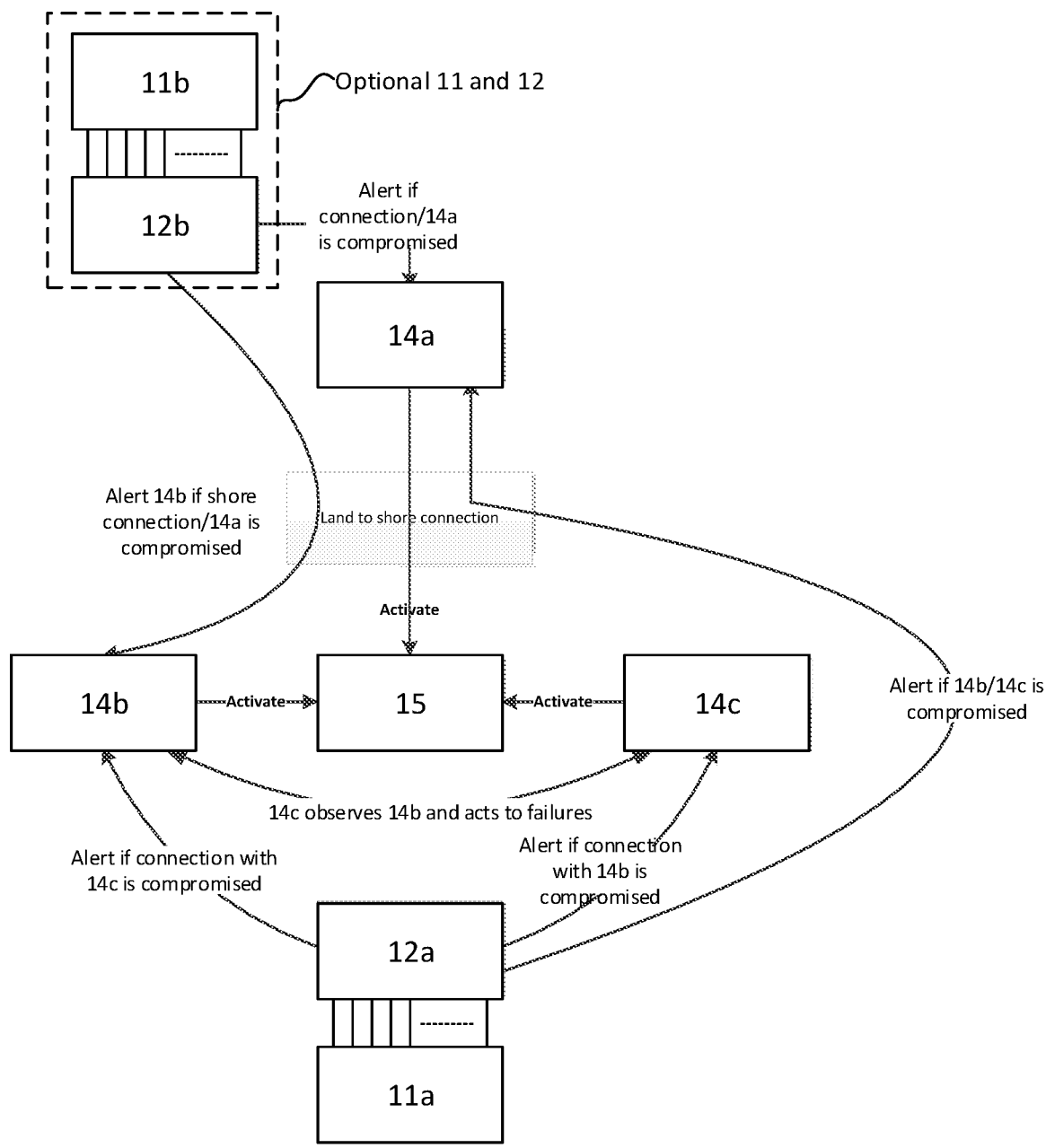
FIG. 3 shows a block diagram of a marine vessel safety system for marine vessels, with redundant components.
Figure 4:
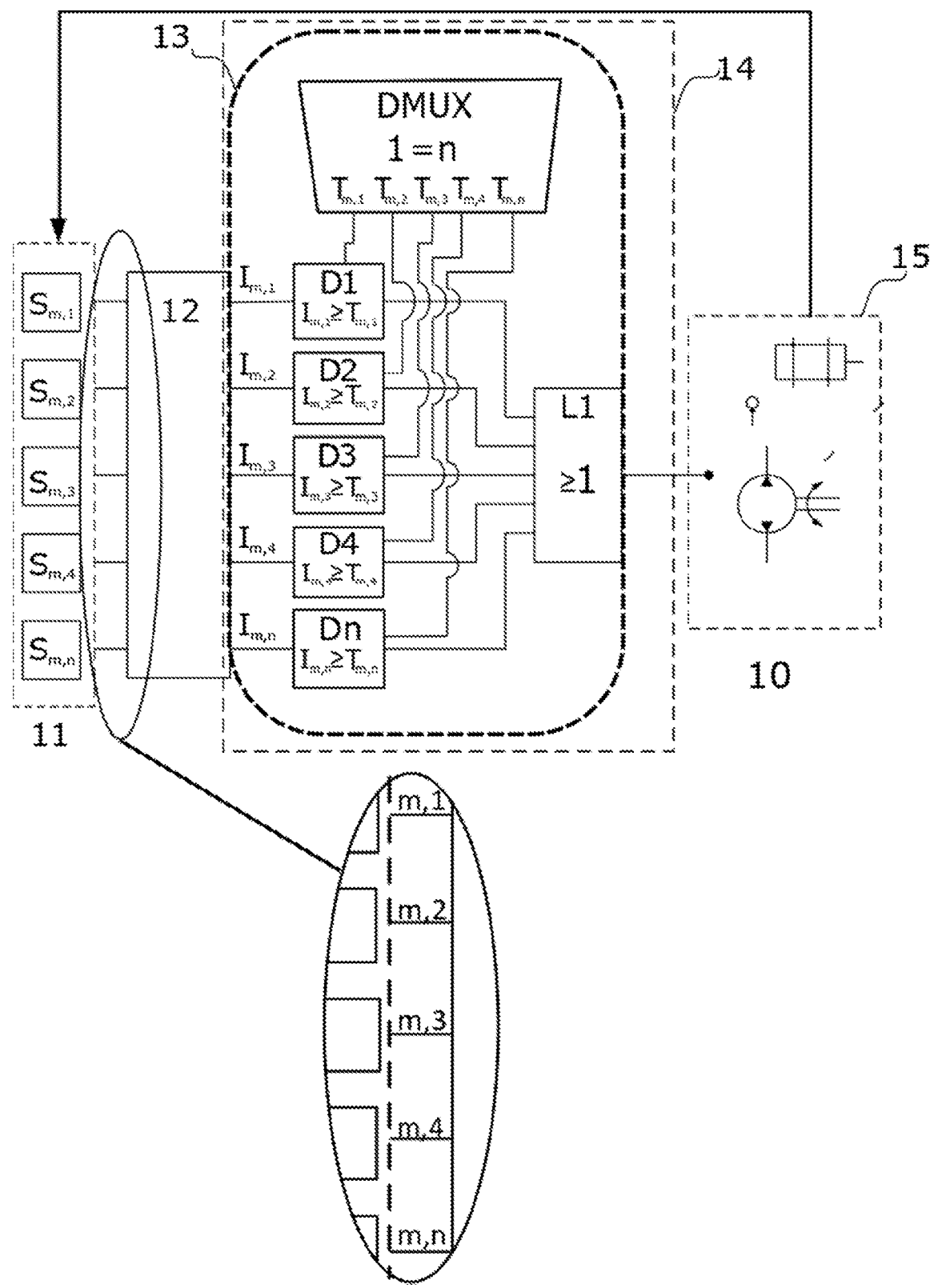
FIG. 4 shows a more detailed view of a non-redundant marine vessel safety system.
Figure 5:
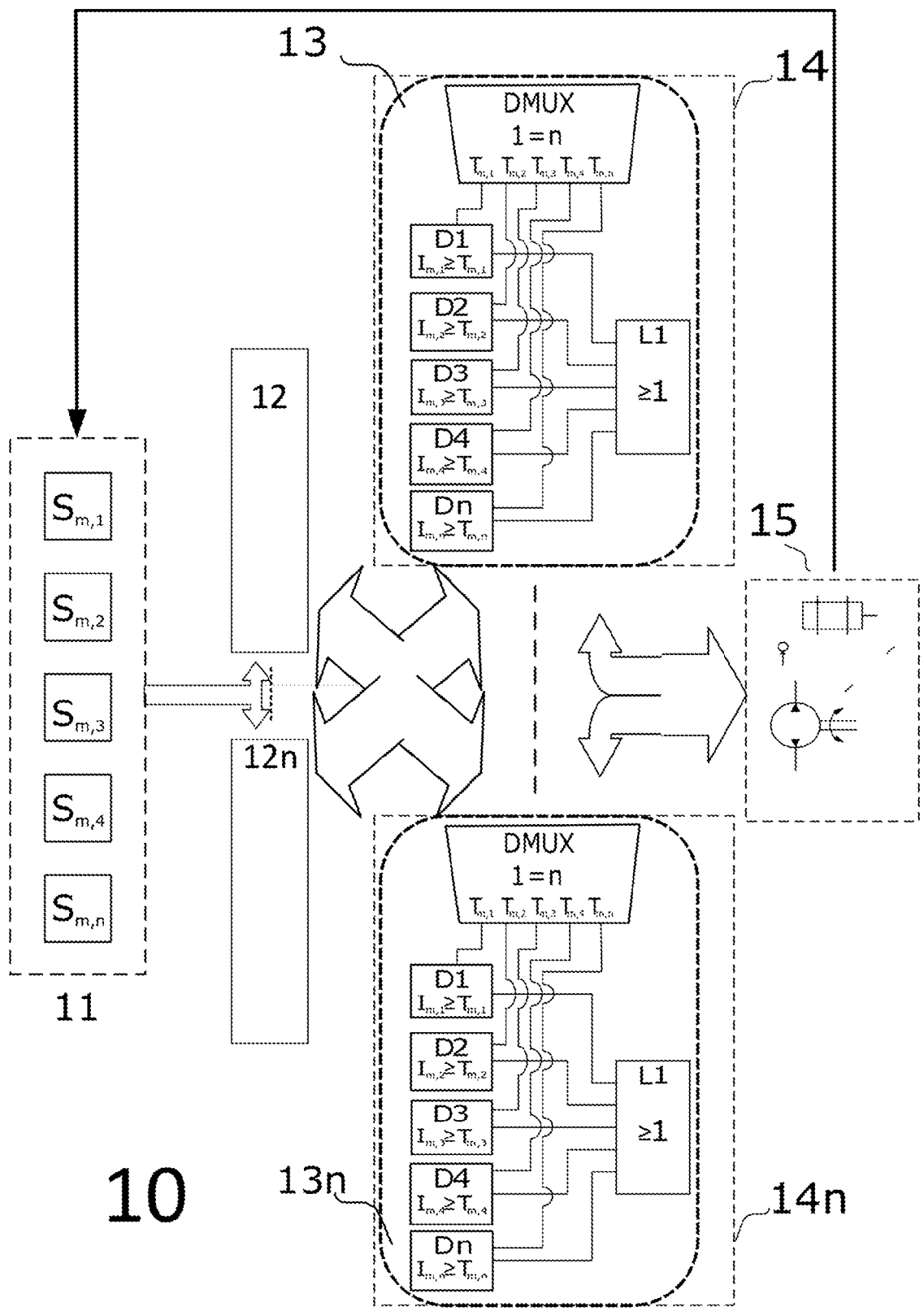
FIG. 5 shows a marine vessel safety system with redundant components or systems.
Figure 6:
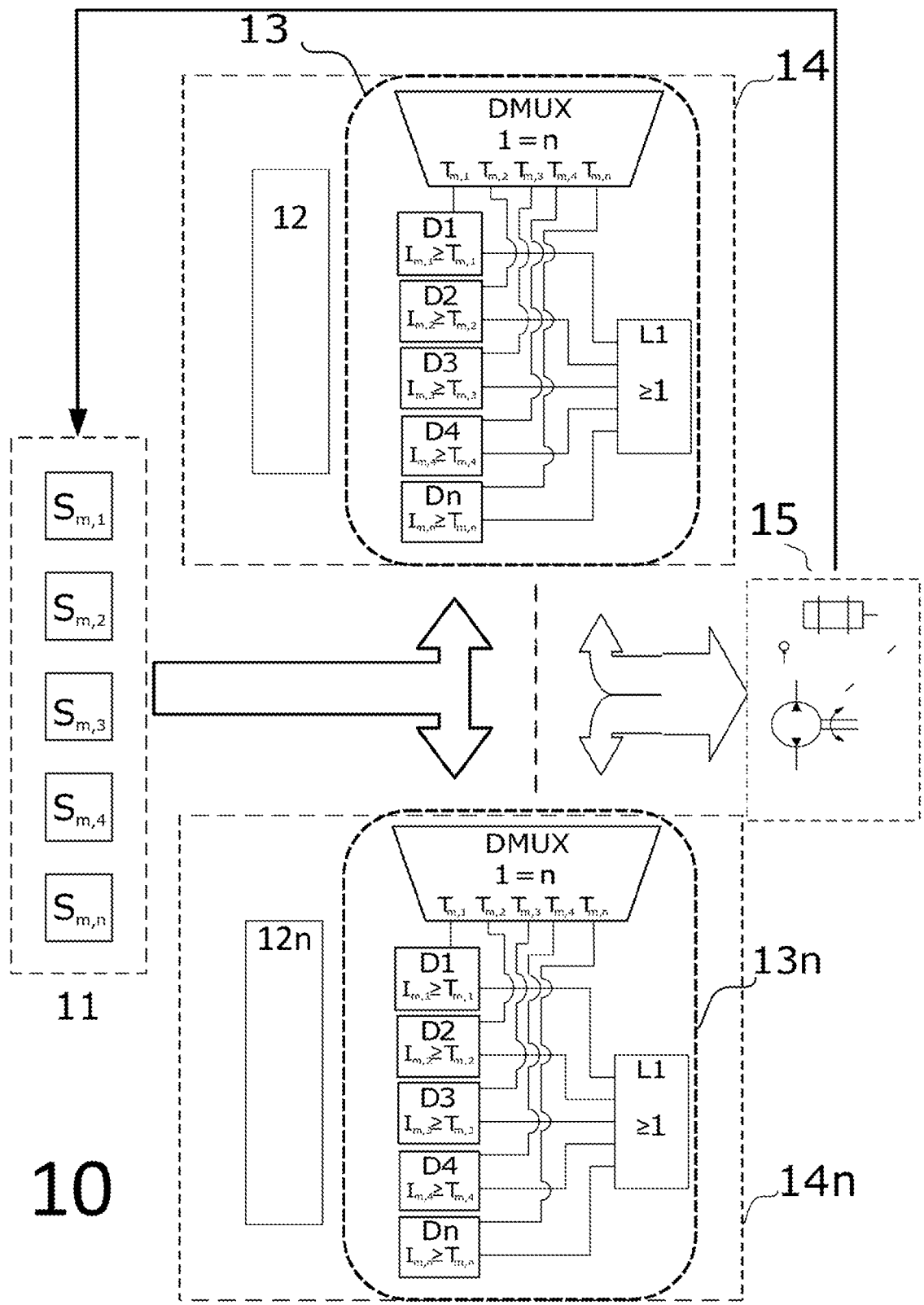
FIG. 6 shows another example of a marine vessel safety system with redundancy, where a monitoring system 12,12n is included in a malfunction evaluation system 14,14n and where a malfunction trigger algorithm is included in a malfunction evaluation system 14, 14n.

The malfunction evaluation system 14, 14n may further comprise at least one malfunction triggering algorithm 13, 13n which determines whether or not a malfunction has been detected. This algorithm can for example evaluate the parameters representing each property by comparing each value to a pre-set range, value or threshold, which defines a "safe range" for the respective property. In one embodiment of the invention, such a malfunction trigger algorithm 13, 13n may be configured to compare each set of parameters m.1, m.2, m.3, m.4, . . . , m.n with a set of allowable threshold values/ranges $T_{m.1}, T_{m.2}, T_{m.3}, T_{m.4}, \ldots, T_{m.n}$. The actual comparison is performed by comparing the value of each parameter $I_{m.1}, I_{m.2}, I_{m.3}, I_{m.4}, \ldots, I_{m.n}$ to the corresponding threshold values $T_{m.1}, T_{m.2}, T_{m.3}, T_{m.4}, \ldots, T_{m.n}$. If any one of the parameter values $I_{m.1}, I_{m.2}, I_{m.3}, I_{m.4}, \ldots, I_{m.n}$ in the set of parameters is outside the corresponding allowable threshold value $T_{m.1}, T_{m.2}, T_{m.3}, T_{m.4}, \ldots, T_{m.n}$ defined in the set of ranges, a malfunction signal will be sent to a logical comparator, L1. This logical comparator will then further output an activation signal to the safe state control system 15. Each threshold value may in the above example include two values, defining a range. With reference to FIG. 3-5, the present invention is shown in block diagrams using logical symbols, the logical symbols shall not be construed as single logical circuits, rather they are meant to ease the understanding of an exemplary logic or algorithm behind the marine vessel safety system 10.

The evaluation of a malfunction may be performed in in light of the state of other vessel operation systems and components 11, as the severity of the malfunction may be highly dependent of the state of the vessel and its systems.

A malfunction related to one of two engines may for example be more severe at the beginning of a journey than at the end. Any malfunction evaluation system 14, 14n may in principle be a system which performs estimates for automation of a vessel, comprising many existing navigational and monitoring subsystems of a vessel. According to one embodiment of the invention any malfunction evaluation systems 14, 14n may comprise at least one system chosen from the group: route planning system, situation awareness system, collision avoidance system and dynamic positioning system. A malfunction evaluation system 14, 14n may also comprise other systems, like a virtual chief engineer, an autonomous navigation system, or any sub component of an autonomous navigation system.

In order to more reliably activate the safe-state control system 15, any one of the malfunction evaluation systems 14 are independently capable of activating the safe-state control system 15. Any malfunction in any of the malfunction evaluation systems 14 in itself is therefore less likely to hinder the activation of the safe-state control system 15, hence improving the probability that a marine vessel enters safe states in the event of malfunctions in vessel operation systems and components 11 of the marine vessel.

The role of the safe-state system is to ensure that the marine vessel enters a safe state where the safety of the vessel itself, the safety of any surrounding vessels and the safety surrounding environment are maintained. The set of commands executable by the safe-state control system 15 may therefore depend both on the severity of the malfunction as well as the state of the vessel operation systems and components 11 of the marine vessel. Examples of commands executable by the safe-state control system 15 comprises at least one command which determines at least one of the following: vessel rudder position, vessel propulsion levels, activation of a dynamic positioning system, activation of a distress signal communication system, activation of a route planning system, activation of a situation awareness system, activation of a collision avoidance system, activation of a machinery recovery system, notification of a remote operator, activation of a sound signal like a vessel whistle, activation of a light signal like a flash signaling device, activation of a light signal like a lantern activation/deactivation, activation of a loudspeaker announcement and disconnect remote control.

The set of commands executable by the safe-state control system 15 may cause the vessel to undertake certain actions, which defines the safe-state in itself. The actions may be chosen from a group comprising: the marine vessel proceeds to the next waypoint, the marine vessel stops and enters DP-mode, the marine vessel returns to the previous waypoint, the marine vessel navigates back to its last known safe position, the marine vessel navigates to the nearest available safe position, the marine vessel drops an anchor, the marine vessel shuts down some machinery, the marine vessel shuts down all machinery, the marine vessel stops propellers and drifts and the marine vessel maintains it relative position relative to an object.

The safe-state control system 15 may comprise pre-defined sets of commands which may be stored in a matrix. Each set of commands among the pre-defined sets of commands may be executed for a certain malfunction, or may be executed for a certain malfunction given a specific state of any one state of any system or component of the marine vessel. The safe-state control system 15 may be firmware programmed. The matrix in the safe-state control system 15 may be firmware programmed.

| Reference list | |
|---|---|
| 10 | A marine vessel safety system. |
| 11 | Vessel operation systems and components of the marine vessel, with sensors and signal transducers adapted for communication with a monitoring system 12 |
| 11a | First vessel operation systems and components of the marine vessel, with sensors and signal transducers adapted for communication with a monitoring system 12a, ref. FIG. 3 |
| 11b | Second (optional) vessel operation systems and components of the marine vessel, with sensors and signal transducers adapted for communication with a monitoring system 12b, ref. FIG. 3 |
| 12-12n | At least one vessel monitoring system adapted to communicate with vessel operations systems and components 11 and with a malfunction evaluation system 14-14n, which may comprise a malfunction trigger algorithm 13-13n. |
| 12a | At least one first vessel monitoring system adapted to communicate with vessel operations systems and components 11a and with a malfunction evaluation system 14a, 14b, 14c, ref. FIG. 3. 14a, 14b, 14c may denote decision making systems. |
| 12b | At least one optional second vessel monitoring system adapted to communicate with vessel operations systems and components 11b and with a malfunction evaluation 14a, 14b, 14c, ref. FIG. 3. 14a, 14b, 14c may denote decision making systems. |
| 13-13n | Malfunction trigger algorithm |
| 14-14n | At least one malfunction evaluation system, receives output values from malfunction trigger algorithm 13, the malfunction evaluation system may comprise the malfunction trigger algorithm 13 and a logic L1. |
| 14a | The first malfunction evaluation system is e.g. being a first decision making system. The first decision making system being a remote operation centre, in FIG. 3 on shore. |
| 14b | The second malfunction evaluation system being a second decision making system. |
| 14c | The third malfunction evaluation system being a third decision making system. |
| 15 | Safe state control system, (safe state matrix) receives control signals from malfunction evaluation system(s) 14, 14n e.g. represented by the output of a logic gate L1. |
| $S_1$ | A first transducer of the vessel operation systems and components 11 of the marine vessel. |
| $S_2$ | A second transducer of the vessel operation systems and components 11 of the marine vessel. |
| $S_3$ | A third transducer of the vessel operation systems and components 11 of the marine vessel. |
| $S_4$ | A fourth transducer of the vessel operation systems and components 11 of the marine vessel. |
| $S_n$ | An nth transducer of the vessel operation systems and components 11 of the marine vessel. |
| D1 | A first discriminator the output is true if an input value $I_{m,1}$ is greater or equals a threshold $T_{m,1}$ |
| D2 | A second discriminator, the output is true if an input value $I_{m,2}$ is greater or equals a threshold $T_{m,2}$. |
| D3 | A third discriminator the output is true if an input value $I_{m,3}$ is greater or equals a threshold $T_{m,3}$. |
| D4 | A fourth discriminator the output is true if an input value $I_{m,4}$ is greater or equals a threshold $T_{m,4}$. |
| Dn | An nth discriminator the output is true if an input value $I_{m,n}$ is greater or equals a threshold $T_{m,n}$. |
| DMUX | A controller symbolically indicated with a demultiplex logic, addressing threshold values to appropriate discriminator (D1, D2, D3, D4, Dn). |
| L1 | Hardware or software giving a true output if input satisfies sudden patterns or values indicated as an OR-function. |
| $I_{m,1}$-$I_{m,n}$ | Input signals to the discriminators D1-Dn, from the monitoring system. The discriminators carrying out a first step in the malfunction trigger algorithm |
| $T_{m,1}$-$T_{m,n}$ | Reference or threshold values as set values to discriminators D1-Dn |
| m.1-m.n | Parameters defining the state of each of the vessel operation systems and components. |

The invention claimed is:

1. A marine vessel safety system which ensures that a remote and autonomous marine vessel enters a safe state in the event of at least one malfunction in any vessel operation systems and components of the marine vessel, the marine vessel safety system comprises:

at least one vessel monitoring system, configured to monitor the vessel operation systems and components of the marine vessel, a plurality of decision-making systems, each comprising at least one malfunction evaluation system configured to detect any malfunction in the vessel operation systems and components of the marine vessel and to evaluate the detected malfunction, a safe-state control system, configured to be activated by any one of the malfunction evaluation systems in the event where any of the malfunction evaluation systems detect any malfunction in the vessel operation systems and components, and to execute a set of control commands, which forces the vessel in to a safe state.

2. The marine vessel safety system according to claim 1, wherein at least one of the plurality of decision-making systems is positioned on-board the remote and autonomous marine vessel.

3. The marine vessel safety system according to claim 1, wherein at least one of the plurality of decision-making systems is at positioned in a location remote from the remote and autonomous marine vessel.

4. The marine vessel safety system according to claim 1, wherein the at least one malfunction evaluation system comprises a vessel monitoring system.

5. The marine vessel safety system according to claim 4, wherein the vessel monitoring system is independent from any other system in the marine vessel.

6. The marine vessel safety system according to claim 4, wherein the vessel monitoring system is autonomous.

7. The marine vessel safety system according to claim 4, wherein the vessel monitoring system is firmware programmed.

8. The marine vessel safety system according to claim 1, wherein at least one of the vessel operation systems and components of the marine vessel is chosen from the group comprising:

engine control system,
propeller,
propulsion control system,
communication system,
navigation system,
water cooling system,
dynamic positioning system,
distress signal communication system,
route planning system,
situation awareness system,
collision avoidance system,
mission management system,
equipment health monitoring system,
energy management system,
integrated alarm system,
cyber security system such as intrusion detection system,
steering gear,
autopilot,
position reference systems,
deck machinery systems,
machinery recovery systems, and
artificial chief engineer.

9. The marine vessel safety system according to claim 1, wherein each state of each of the vessel operation systems and components of the marine vessel is defined by a set of any number, n, of parameters, m.1, m.2, m.3, m.4, . . . , m.n.

10. The marine vessel safety system according to claim 9, wherein at least one of the parameters, in at least one of the sets of any number of parameters, represents a property of the respective vessel operation system or component of the marine vessel chosen from the group comprising:
- pressure,
- temperature,
- sound,
- voltage,
- frequency,
- gas-concentration,
- humidity,
- pH,
- connectivity capability,
- network activity,
- software component activity,
- CPU load,
- memory usage,
- connectivity activity,
- position, and
- latency.

11. The marine vessel safety system according to any of the claim 9, wherein the vessel monitoring system is configured to:
monitor each set of parameters, m.1, m.2, m.3, m.4, . . . , m.n, defining the state of each of the vessel operation systems and components of the marine vessel.

12. The marine vessel safety system according to claim 11, wherein the at least one malfunction evaluation system comprises at least one malfunction trigger algorithm.

13. The marine vessel safety system according to claim 12, wherein the at least one of malfunction trigger algorithm is configured to:
compare each set of parameters m.1, m.2, m.3, m.4, . . . , m.n with a set of allowable threshold values $T_{m.1}$, $T_{m.2}$, $T_{m.3}$, $T_{m.4}$, . . . , $T_{m.n}$ defined as a set of ranges, each set of ranges is associated with a particular set of parameters m.1, m.2, m.3, m.4, . . . , m.n, and if any one of the parameter values $I_{m.1}$, $I_{m.2}$, $I_{m.3}$, $I_{m.4}$, . . . , $I_{m.n}$ in the set of parameters is outside the corresponding allowable threshold value $T_{m.1}$, $T_{m.2}$, $T_{m.3}$, $T_{m.4}$, . . . , $T_{m.n}$ defined in the set of ranges, then send a malfunction signal to a logical comparator, which outputs an activation signal to the safe state control system.

14. The marine vessel safety system according to claim 1, wherein the malfunction evaluation system, evaluates the detected malfunction in light of the state of at least one other amongst the vessel operation systems and components of the marine vessel.

15. The marine vessel safety system according to claim 1, wherein the malfunction evaluation system, comprises at least one system chosen from the group comprising:
- route planning system,
- situation awareness system,
- collision avoidance system, and
- dynamic positioning system.

16. The marine vessel safety system according to claim 1, wherein said set of control commands executable by the safe-state control system is chosen based on any of the sets of parameters that defines the states of the vessel operation systems and components of the marine vessel.

17. The marine vessel safety system according to claim 1, wherein said set of control commands executable by the safe-state control system comprises at least one control command which determines at least one of the following:
- vessel rudder position,
- vessel propulsion levels,
- activation of a dynamic positioning system,
- activation of a distress signal communication system,
- activation of a route planning system,
- activation of a situation awareness system,
- activation of a collision avoidance system,
- activation of a machinery recovery system,
- notification of a remote operator,
- activation of a sound signal,
- activation of a flashing light signal,
- activation of a light signal,
- activation of a loudspeaker announcement, and
- disconnect remote control.

18. The marine vessel safety system according to claim 1, wherein at least one safe state is defined amongst the actions chosen from the group comprising:
- the marine vessel proceeds to the next waypoint,
- the marine vessel stops and enters DP-mode,
- the marine vessel returns to the previous waypoint,
- the marine vessel navigates back to its last known safe position,
- the marine vessel navigates to the nearest available safe position,
- the marine vessel drops an anchor,
- the marine vessel shuts down some machinery,
- the marine vessel shuts down all machinery,
- the marine vessel stops propellers and drifts, and
- the marine vessel maintains it relative position relative to an object.

* * * * *